United States Patent [19]

Asano et al.

[11] 4,339,991

[45] Jul. 20, 1982

[54] WIND CONTROL APPARATUS FOR AIR CONDITIONER

[75] Inventors: Tetsumasa Asano; Mitsuhiro Fujimoto; Ryuichi Mizukawa, all of Himeji, Japan

[73] Assignee: Mitsubishi Denki Kabushiki Kaisha, Tokyo, Japan

[21] Appl. No.: 184,170

[22] Filed: Sep. 4, 1980

[30] Foreign Application Priority Data

Sep. 13, 1979 [JP] Japan .................. 54-118584

[51] Int. Cl.³ ............................. F24F 13/10
[52] U.S. Cl. ........................ 98/40 VM; 98/2; 98/40 E; 98/40 V
[58] Field of Search .......... 98/2, 40 E, 40 V, 40 VM, 98/94, 103, 108, 110, 111, 112, 113, 121 A; 415/125

[56] References Cited

U.S. PATENT DOCUMENTS

| | | | |
|---|---|---|---|
| 3,242,846 | 3/1966 | Bunn | 98/40 |
| 3,252,398 | 5/1966 | First | 98/40 V |
| 3,330,202 | 7/1967 | Colle | 98/40 V |
| 3,380,372 | 4/1968 | Perry | 98/121 |
| 3,577,905 | 4/1971 | Hussdorfer et al. | 98/94 |
| 3,683,787 | 8/1972 | Cary | 98/40 V |
| 3,699,873 | 10/1972 | Irvin | 415/125 X |
| 3,777,650 | 12/1973 | Wenig | 98/40 V |
| 4,018,159 | 4/1977 | Bennett | 98/40 VM |

FOREIGN PATENT DOCUMENTS 1177390 1/1970 United Kingdom .
1452270 10/1976 United Kingdom .

Primary Examiner—Lloyd L. King
Assistant Examiner—Harold Joyce
Attorney, Agent, or Firm—Oblon, Fisher, Spivak, McClelland & Maier

[57] ABSTRACT

A wind control apparatus for an air conditioner comprises a pair of first wind-deflection plates for changing the direction of wind in a first axial direction by manual operation independent each other; a pair of second wind-deflection plates for changing the direction of wind periodically in a second axial direction with a driving means; and a phase adjusting means placed between the second wind-deflection plates and the driving means so as to change the phase of wind direction by manual operation.

1 Claim, 4 Drawing Figures

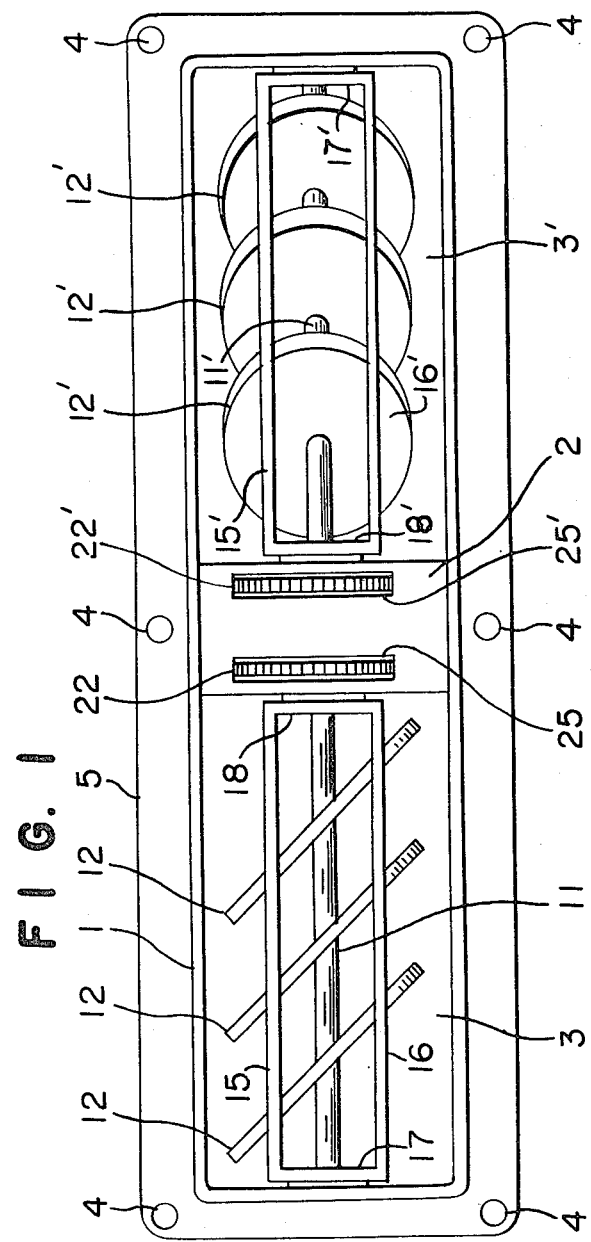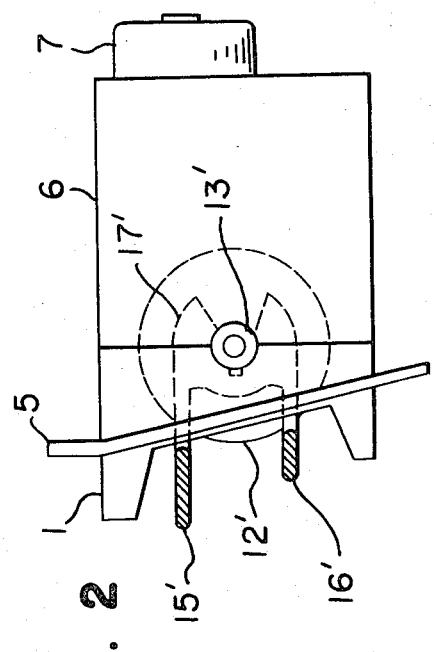

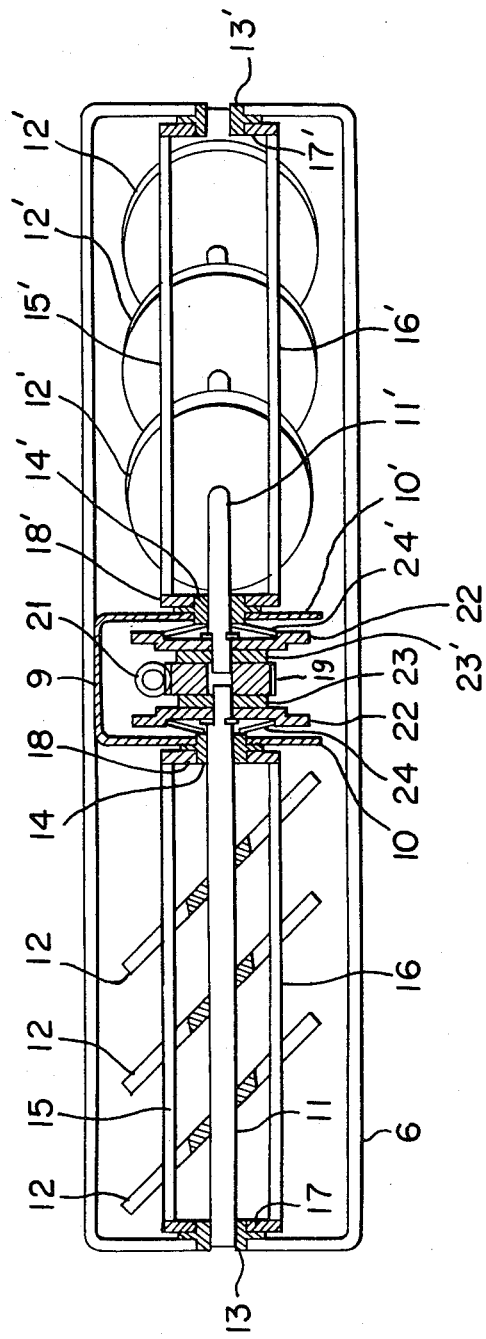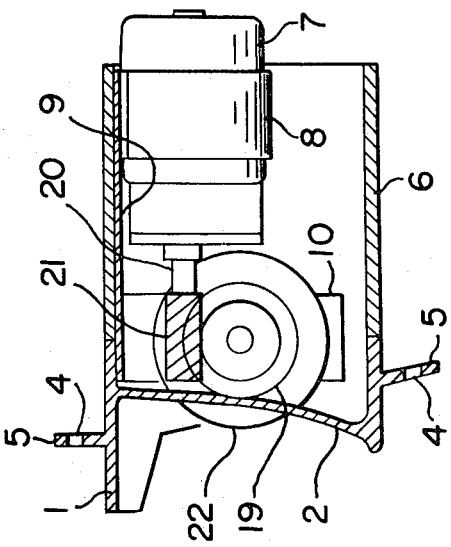

WIND CONTROL APPARATUS FOR AIR CONDITIONER

BACKGROUND OF THE INVENTION

1. Field of the Invention

The present invention relates to an improvement of a wind control apparatus for an air conditioner.

2. Description of the Prior Art

The conventional air conditioner for an automobile has a pair of central blowing openings for the driver and for a passenger which allow manual operation to adjust the vertical and horizontal directions of wind independently each other. The conventional apparatus has disadvantages of excessive cooling and removing water from human eyes since the direction of wind after the adjustment is fixed.

Air conditioners (coolers) and electric fans for domestic use, widely used, are the type that changes the direction of wind by rotating series of obliquely placed plates or swinging a series of rectangular plates with a small-sized motor. The conventional apparatus has a disadvantage in that the wind direction to be changed is limited to only one axial direction (usually in the horizontal direction).

SUMMARY OF THE INVENTION

It is an object of the present invention to provide a wind control apparatus which performs wind control in two axial directions, if desired, even though the apparatus has a continuous wind-deflection device acting in only one axial direction.

The foregoing and the other objects of the present invention have been attained by providing a wind control apparatus for an air conditioner which comprises a first pair of wind-deflection plates for changing the direction of wind in a first axial direction by manual operation independently each other; a second pair of wind-deflection plates for changing the direction of wind periodically in a second axial direction with a driving means; and phase adjusting means placed between the second wind-deflection plates and the driving means so as to change the phase of wind direction by manual operation.

BRIEF DESCRIPTION OF THE DRAWINGS

FIG. 1 is a front view of an embodiment of the wind control apparatus of the present invention;

FIG. 2 is a side view of the wind control apparatus;

FIG. 3 is a partially sectional view of FIG. 1; and

FIG. 4 is a partially sectional view of FIG. 2.

The same reference numerals designate the same or corresponding parts throughout the figures.

DETAILED DESCRIPTION OF THE PREFERRED EMBODIMENT

An embodiment of the present invention will be described with reference to drawings. In the drawings, the reference numeral (1) designates a front frame having a pair of wind openings (3), (3′) at both sides of a central plate (2). In the peripheral part of the front frame (1), a flange (5) is extended with a plurality of fitting holes (4) which are used for fixing the wind control apparatus to a wind-blowing opening (not shown). The reference numeral (6) designates a rear frame of a rectangularly tubular body to be fixed to the front frame with screws: (7) designates a small-sized motor including a reduction mechanism which is fixed through a steel band (8) and a base plate (9) to the rear frame with screws; (10), (10′) designate bent portions of the base plate (9); (11), (11′) designate rotary shafts on which a plurality of second wind-deflection plates (12), (12′) formed, for example, by positioning discs obliquely, are secured; (13), (13′) designate bearings held by the front frame (1) and the rear frame (6); (14), (14′), designate bearings secured to the bend portions (10), (10′). The rotary shafts (11), (11′) are respectively supported by and in slidable-contact with the bearings (13) and (14) and the bearings (13′) and (14′). The reference numerals (15), (16) and (15′), (16′) designate first wind-deflection plates which are slidably fitted through side plates (17), (18) and (17′), (18′) around the outer surfaces of the bearings (13), (14) and (13′), (14′) respectively.

A worm wheel (19) is driven by a worm gear (21) fixed to the output shaft (20) of the small-sized motor (7) and is fitted slidably on both ends of the rotary shafts (11), (11′).

Phase adjusting devices (22), (22′) are pushed by springs (24), (24′) toward the worm wheel (19) through linings (23), (23′) and are supported in a non-slidable manner on the ends of the rotary shafts (11), (11′) so as to expose a part of the outer portion of the device outside the slits (25), (25′) of the central plate (2).

In this embodiment, when the first wind-deflection plates (15), (15′) are turned vertically, the first wind-deflection plates (16), (16′) are also moved vertically in association therewith. The direction of a cold wind or a warm wind supplied from the wind openings (3), (3′) can be manually adjusted vertically independently of each other.

When the small-sized motor (7) is operated through an electric circuit (not shown), the worm wheel (19) is rotated by the worm gear (21) so that the second wind-deflection plates (12), (12′) respectively fixed to the rotary shafts (11), (11′) are rotated through the phase adjusting devices (22), (22′) by frictional force of the linings (23), (23′) which are pushed by the springs (24), (24′), thus the direction of wind is continuously changed to the left and the right.

It is preferable to determine the cycle of change at, for example, one stroke per ten seconds or so. Accordingly, the phase adjusting devices (22), (22′) exposed outside the slits (25), (25′) are slowly rotated during the operation of the small-sized motor (7).

The relative angular position of the second wind-deflection plate (12) to (12′) can be adjusted as desired by manually turning the phase adjusting device (22) or (22′) beyond the frictional force of the linings (23) or (23′). Accordingly, the direction of wind blown from the wind openings (3), (3′) are uniformly changed left and right by adjusting the second wind-deflection plates (12), (12′) so as to have the same phase, thus wind blowing upward or downward or wind blowing both directions can be obtained depending upon the vertical positions of the first wind-deflection plates (15), (16), (15′) and (16′).

It is possible to attain an operation as if the direction of the wind is continuously changed vertically by adjusting the second wind-deflection plates (12), (12′) in the opposite phase and directing the first wind-deflection plates (15), (16) upward and (15′), (16′) downward so as to alternate the upward blowing wind and the downward blowing wind in opposite phase and left and right.

When a fixed direction of wind to left or right is desired, the small-sized motor is stopped and the second deflection plates are moved to a desired direction through the phase adjusting devices (22), (22') by manual operation.

The following modifications can be easily carried out in the embodiment of the invention as illustrated in the figures.

(1) Rectangular plates can be used for the second wind-deflection plates, instead of discs, so as to conduct a swing movement.

(2) An over-running clutch system such as a ratchet wheel can be employed for the phase adjusting device instead of a friction type slider system.

(3) The small-sized motor as the driving source can be replaced by a rotary solenoid and the second pair of wind-deflection plates can be provided with their own driving source depending upon the space and the arrangement.

The wind control apparatus of the present invention is suitably used as an air-conditioner in an automobile which holds a small number of passengers and as a cooler for domestic use, for example, placed in a relatively small study room for children.

As is evident from the above description, the wind control apparatus of the present invention comprises a pair of wind-deflection devices placed in parallel so as to attain wind control in biaxial direction even by using mono-axial driving source, thus the structure can be simple and variable wind directions can be obtained.

We claim:

1. A wind control apparatus for an air conditioner which comprises a pair of first wind-deflection plates for changing the direction of wind in a first axial direction by manual operation independent each other; a pair of second wind-deflection plates for changing the direction of wind periodically in a second axial direction; a driving means; and a phase adjusting means placed between each of the second wind-deflection plates and the driving means so as to selectively change the phase of wind direction by manual operation, wherein said phase adjusting means comprises drive transmission coupling means and means adapted for overriding said coupling means while said driving means is operating, said drive transmission coupling means comprising a friction coupling and said means adapted for overriding comprising means for selectively moving one of said second wind deflection plates and said drive means while the other of said second wind deflection plates is held stationary.

* * * * *